US 6,631,213 B1

(12) United States Patent
Amonou et al.

(10) Patent No.: US 6,631,213 B1
(45) Date of Patent: Oct. 7, 2003

(54) METHODS AND DEVICES FOR CODING AND DECODING DIGITAL SIGNALS, AND SYSTEMS USING THEM

(75) Inventors: Isabelle Amonou, Thorigne-Fouillard (FR); Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,700

(22) Filed: Mar. 31, 2000

(30) Foreign Application Priority Data

Apr. 8, 1999 (FR) .............................................. 9904403

(51) Int. Cl.[7] ................................................. G06K 9/36
(52) U.S. Cl. ..................................................... 382/232
(58) Field of Search ................................ 382/232, 233, 382/236, 238, 240, 242, 248, 250; 358/432, 433; 348/384.1, 394.1, 395.1, 400.1–404.1, 407.1–416.1, 420.1, 421.1, 425.2, 430.1, 431.1

(56) References Cited

U.S. PATENT DOCUMENTS

| | | | | |
|---|---|---|---|---|
| 5,050,230 A | * | 9/1991 | Jones et al. | 382/232 |
| 5,128,757 A | | 7/1992 | Citta et al. | 358/133 |
| 5,282,255 A | * | 1/1994 | Bovik et al. | 382/232 |
| 5,892,847 A | * | 4/1999 | Johnson | 382/232 |
| 6,021,224 A | * | 2/2000 | Castelli et al. | 382/232 |
| 6,377,309 B1 | * | 4/2002 | Ito et al. | 348/554 |

FOREIGN PATENT DOCUMENTS

EP              899960         3/1999

OTHER PUBLICATIONS

Jourdan et al., "Edge—Preserving ADPCM and ECVQ Coding of Image Sub–Bands Using Subjective Criteria", Proc. of the ICIP, NY., IEEE, 16–19, Sep. 1996, pp. 411–414.

Olivier Egger et al., "High Compression Image Coding Using an Adaptive Morphological Subband Decomposition", Proceedings of the IEEE, vol. 83, No. 2, Feb. 1995, pp. 272–287.

R. Rinaldo et al., "An Image Coding Scheme Using Block Prediction of the Pyramid Subband Decomposition", IEEE, 1994, pp. 878–882.

J. M. Shapiro, "Embedded Image Coding Using Zerotrees of Wavelet Coefficients", IEEE, 1993, pp. 3445–3462.

F. Bellifemine et al., "Combining DCT and Subband Coding into an Intraframe Coder", Signal Processing Image Communication, May 1993, No. 3, pp. 235–248.

P. Scotton et al., "A Low Complexity Video Subband Coder for ATM", Signal Processing Image Communication, Oct. 1994, No. 5, pp. 421–433.

S. Pei et al., "Hierarchical Image Representation by Mathematical Morphology Subband Decomposition", Pattern Recognition Letters, Feb. 1995, No. 2, pp. 183–192.

* cited by examiner

*Primary Examiner*—Jose L. Couso
(74) *Attorney, Agent, or Firm*—Fitzpatrick, Cella, Harper & Scinto

(57) ABSTRACT

In order to code a digital signal, a simplified version of the digital signal is determined, containing only some of the information contained in the digital signal. The simplified version is coded by means of a predetermined single coding technique. This simplified version is subtracted from the digital signal, so as to obtain a residual signal. From each block of the simplified version, there is selected, for each corresponding block of the residual signal, a coding technique amongst a predetermined number M of coding techniques $C_i$, where i is an integer between 1 and M. Each block of the residual signal is coded by means of the previously selected coding technique.

32 Claims, 7 Drawing Sheets

METHODS AND DEVICES FOR CODING AND DECODING DIGITAL SIGNALS, AND SYSTEMS USING THEM

The present invention relates to a method and device for coding digital signals, to a method and device for decoding these same digital signals, and to systems using them.

The digital signals in question can be images, video signals, sound signals or data. Here the invention will be described particularly in its application to digital signals representing images.

In the field of digital signal coding, it is sometimes advantageous to use several coding techniques for coding the same set of data. In such case, by virtue of a selection method, based for example on an optimum transmission rate allocation criterion, the best coding technique is chosen and applied locally.

For the decoder to be able to correctly decode the coded signals which it receives, an item of information referred to as a "flag" is, conventionally, generally transmitted, making it possible to know which coding technique has been used on each signal portion.

Thus, for example, in accordance with the prior art, a digital image can be divided into blocks, and, for coding each block, it is possible to have a choice between coding by vector quantisation and coding by discrete cosine transform (DCT). Each block is coded by the most appropriate method within the terms of a criterion fixed a priori, and a flag is transmitted with the image signal, in order to indicate, for each block, whether vector quantisation or DCT has been used.

The flag is for example a word able to take as many different values as there are different coding techniques used for coding the blocks.

This way of proceeding according to the prior art has notably the drawback of requiring the transmission, from the coder to the decoder, of a large amount of information in addition to the coded signal proper, and therefore of reducing the compression rate of the signals, which consequently limits the transmission rate.

In an article entitled "High compression image coding using an adaptive morphological sub-band decomposition", in Proceedings of the IEEE, vol. 83, No 2, February 1995, O. Egger, W. Li and M. Kunt proposed a technique for coding an image signal using an adaptive decomposition of the signal, which uses either linear filters, for the textured regions of the image, or morphological filters, for the other regions of the image. No "flag" is transmitted to the decoder.

On the other hand, this method of the prior art has the drawback of requiring the coder and decoder to both calculate the local variance for each pixel of the original image, in order to determine whether or not the region in question is a textured region, knowing that a texture has a high local variance in all directions.

This method therefore has the drawback of entailing high calculation cost due to the seeking of textured regions, given that the decision on the textured character is made pixel by pixel.

The aim of the present invention is to remedy the aforementioned drawbacks of the prior art, by eliminating the need to transmit, from the coder to the decoder, additional explicit information indicating the coding technique used and lessening the calculation cost, whilst making it possible to improve the compromise between the compression and distortion rates of the signals.

To this end, the present invention proposes a method of coding a digital signal, characterised in that:

(a) a signal simplification step is performed, during which a simplified version of the digital signal is determined, containing only part of the information contained in this digital signal;

(b) a step of coding the simplified signal is performed, during which the simplified version is coded by means of a predetermined single coding technique;

(c) a subtraction step is performed, during which this simplified version is subtracted from the digital signal so as to obtain a residual signal;

(d) a coding selection step is performed, during which, on the basis of each block of the simplified version, one coding technique, amongst a predetermined number M of coding techniques $C_i$, where i is an integer between 1 and M, is selected for each corresponding block of the residual signal;

(e) a residual signal coding step is performed, during which each block of the residual signal is coded by means of the previously selected coding technique.

Thus the choice of the coding technique is made on the basis of the simplified version of the original signal, and no flag directly bearing a mention of the coding technique used is transmitted from the coder to the decoder.

Given that the simplified version of the original signal contains a smaller quantity of information compared with the original signal, it offers great simplicity of coding. In addition, this simplified version being a subset of the total information contained in the original signal, the addition cost, compared with the cost necessary for coding the image in its totality, is nil, or low where there exists redundancy between the simplified version and the residual signal. This thus makes it possible to save on all or part of the transmission rate which, according to the prior art, was reserved for the transmission of flags.

The above simplified signal coding step (b) can be performed either at the end of the steps (a) of simplification, (c) of subtraction, (d) of coding selection or (e) of residual coding. This gives the present coding method great flexibility of implementation.

In a particular embodiment where the digital signal is an image signal, according to a first variant, the aforementioned simplified version can have the same spatial resolution as the original digital signal. For example, it can be a simplified image obtained by opening-closing followed by morphological reconstruction. For more details on the concept of morphological reconstruction, reference can usefully be made to the article by P. Salembier entitled "Morphological multiscale segmentation for image coding", in Signal Processing, 1994, No 38, pages 359–386.

This type of operators had the advantage of eliminating all the objects smaller than a certain size, and of restoring the contours of the objects which have not been completely eliminated. This still further facilitates the coding of the simplified image.

In this particular embodiment, according to a second variant, the simplified version can have a spatial resolution less than that of the original signal.

Such a simplified image can for example have been obtained by wavelet decomposition of the original signal and definition of the simplified image as being a sub-band obtained by low-pass filtering during this wavelet decomposition.

The obtaining of such a simplified image has the advantage of guaranteeing a concentration, in the aforementioned low sub-band, of the information contained in the original image.

According to a first aspect of the coding method of the present invention, at the coding selection step (d), a prediction step is performed during which, on the basis of the simplified version, the most appropriate coding technique amongst the M coding techniques Ci is predicted for each block of the digital signal, and in addition steps are performed according to which:

(f) an optimised coding selection step is performed, during which, using a predetermined optimisation criterion, the most appropriate coding technique amongst the M coding techniques Ci is selected for each block of the residual signal, and this block is coded by means of the coding technique selected;

(g) a comparison step is performed, during which, for each block of the digital signal, the coding technique predicted at the coding selection step (d) and the coding technique selected at the optimised coding selection step (f) are compared; and (h) a storage step is performed, during which, if the predicted and selected coding techniques are identical, there is stored, with a view to decoding, a flag according to which the prediction made at the coding selection step (d) is correct, and otherwise a flag is stored according to which this prediction is false.

Thus there is transmitted, from the coder to decoder, not directly information relating to the coding technique used for each block of the signal, but more condensed information, able to be coded by means of a single bit, giving information on the validity of the prediction of the coding technique. This makes it possible to arrive at a compromise between the compression and distortion rates of the signals more advantageous than those proposed by the prior art.

According to the aforementioned first aspect, the optimisation criterion can consist of maximising the ratio of transmission rate to distortion, which effectively helps to obtain an advantageous compromise between the compression and distortion rates of the signals.

According to a second aspect of the coding method of the invention, according to which the digital signal is an image signal and the M coding techniques Ci comprise a technique of coding with losses of information and a technique of coding without losses of information, at the coding selection step (d), the presence of contours is sought in each block of the simplified version, and then (d1) a coding step without losses is performed, during which, if the block under consideration contains at least one contour, the corresponding block of the residual signal is coded by means of the coding technique without losses of information; or (d2) a step of coding with losses is performed, during which, if the block under consideration contains no contour, the corresponding block of the residual signal is coded by means of the coding technique with losses of information.

The contour detection used here is particularly advantageous through its simplicity and through the high-performance nature of several contour detection techniques well known to persons skilled in the art. Moreover, if it is chosen to seek the contours, this is because errors on contours are more visible than errors on textures.

For the same purpose as mentioned above, the present invention also proposes a method of decoding a coded digital signal, this coded signal coming from an original digital signal decomposed into a simplified version and a residual signal, obtained by subtracting the simplified version from the original digital signal, the simplified version being coded by means of a predetermined single coding technique, and the residual signal being coded by means of a coding technique selected from amongst a predetermined number M of coding techniques Ci, where i is an integer between 1 and M, characterised in that:

a simplified signal decoding step is performed, during which the simplified version is decoded by means of the decoding technique associated with the predetermined single coding technique; and a decoding selection step is performed, during which, on the basis of each block of the decoded simplified version, there is selected, for each corresponding block of the residual signal, a decoding technique taken from amongst a predetermined number M of decoding techniques Di respectively associated with the M coding techniques Ci;

a residual signal decoding step is performed, during which each block of the residual signal is decoded by means of the decoding technique which was selected for this block; and an addition step is performed, during which the decoded simplified version is added to the decoded residual signal, so as to reconstitute the original digital signal.

According to the first aspect of the invention, during the decoding selection step, a prediction step is performed, during which, on the basis of each block of the decoded simplified version, there is predicted, for the corresponding block of the residual signal, the most appropriate decoding technique associated with one of said M coding techniques Ci;

a reading step is performed, during which a flag associated with the block of the simplified version under consideration is read, relating to the validity of the prediction of the coding technique for the corresponding block of the digital signal;

a residual signal decoding step is performed, during which, if and only if, according to this flag, the prediction is correct, the corresponding block of the residual signal is decoded by means of the predicted decoding technique.

According to the second aspect of the invention, during the decoding selection step, the presence of contours is sought in each block of the decoded simplified version, and then a decoding step without losses is performed, during which, if the block under consideration contains at least one contour, the corresponding block of the residual signal is decoded by means of the technique of decoding without losses of information associated with the technique of coding without losses of information; or a decoding step with losses is performed, during which, if the block under consideration contains no contour, the corresponding block of the residual signal is decoded by means of the technique of decoding with losses of information associated with the technique of coding with losses of information.

The present invention also proposes a device for coding a digital signal, characterised in that it has:

simplification means, for determining a simplified version of the digital signal, containing only some of the information contained in the digital signal;

first coding means, for coding the simplified version by means of a predetermined single coding technique;

subtraction means, for subtracting the simplified version from the digital signal, so as to obtain a residual signal;

coding selection means, for selecting, on the basis of each block of the simplified version, for each corresponding block of the residual signal, a coding technique amongst a predetermined number M of coding techniques Ci, where i is an integer between 1 and M; and second coding means, for coding each block of the residual signal by means of the coding technique selected by the selection means.

According to a particular characteristic, the coding selection means include prediction means for predicting, on the basis of the simplified version, for each block of the digital signal, the most appropriate coding technique amongst the M coding techniques Ci.

The present invention also proposes a device for decoding a coded digital signal, the coded signal coming from an original digital signal decomposed into a simplified version and a residual signal, obtained by subtracting the simplified version from the original digital signal, the simplified version being coded by means of a predetermined single coding technique, and the residual signal being coded by means of a coding technique selected from amongst a predetermined number M of coding techniques Ci, where i is an integer between 1 and M, characterised in that it has:

first decoding means, for decoding the simplified version by means of the decoding technique associated with the predetermined single coding technique;

decoding selection means, for selecting, on the basis of each block of the decoded simplified version, for each corresponding block of the residual signal, a decoding technique taken from amongst a predetermined number M of decoding techniques Di respectively associated with the coding techniques Ci;

second decoding means, for decoding each block of the residual signal by means of the decoding technique selected for this block by the selection means; and adding means, for adding the decoded simplified version to the decoded residual signal, so as to reconstitute the original digital signal.

According to a particular characteristic, the decoding selection means have prediction means for predicting, on the basis of each block of the decoded simplified version, for the corresponding block of the residual signal, the most appropriate decoding technique associated with one of the M coding techniques Ci.

The invention also relates to:

any digital signal processing apparatus having means adapted to implement a coding method as succinctly disclosed above;

any digital signal processing apparatus having a coding device as succinctly disclosed above;

any digital signal processing apparatus having means adapted to implement a decoding method as succinctly disclosed above; and any digital signal processing apparatus having a decoding device as succinctly disclosed above.

The invention also relates to:

an information storage means which can be read by a computer or a microprocessor storing instructions of a computer program, making it possible to implement the coding and/or decoding method of the invention as succinctly disclosed above, and an information storage means which is removable, partially or totally, and which can be read by a computer or a microprocessor storing instructions of a computer program, making it possible to implement the coding and/or decoding method as succinctly disclosed above.

The particular characteristics and the advantages of the coding device, of the decoding method and device, of the digital signal processing apparatus and the information storage means being the same as those of the coding method of the invention, they are not repeated here.

The invention also proposes a method of coding a digital signal, comprising the steps of:

generating a simplified signal and a residual signal from the digital signal;

determining a coding technique for said residual signal among a set of coding techniques on the basis of a feature of said simplified signal;

coding said residual signal with said determined coding technique and said simplified signal with a predetermined coding technique.

According to a particular characteristic, the method further comprises the step of:

dividing said simplified signal and said residual signal into a plurality of blocks respectively.

According to a particular characteristic, said determining step determines coding techniques on the basis of each block of said simplified signal for each corresponding block of said residual signal.

According to a particular characteristic, said simplified signal is generated by a wavelet transformation of the digital signal.

The invention also proposes a method of decoding a signal coded by means of a coding method as succinctly disclosed above, comprising the steps of:

decoding the coded simplified signal;

determining a decoding technique for said coded residual signal among a set of decoding techniques on the basis of a feature of said decoded simplified signal;

decoding said coded residual signal with said determined decoding technique.

According to a particular characteristic, said determining step determines decoding techniques on the basis of each block of said decoded simplified signal for each corresponding block of said coded residual signal.

The invention also proposes a device for coding a digital signal, adapted to implement a coding method as succinctly disclosed above.

The invention also proposes a device for decoding a digital signal, adapted to implement a decoding method as succinctly disclosed above.

The invention also relates to a digital signal processing apparatus, adapted to implement a coding method as succinctly disclosed above.

The invention also relates to a digital signal processing apparatus, adapted to implement a decoding method as succinctly disclosed above.

Other aspects and advantages of the invention will emerge from a reading of the following detailed description of particular embodiments, given by way of non-limitative examples. The description refers to the drawings which accompany it, in which.

Figure 1:
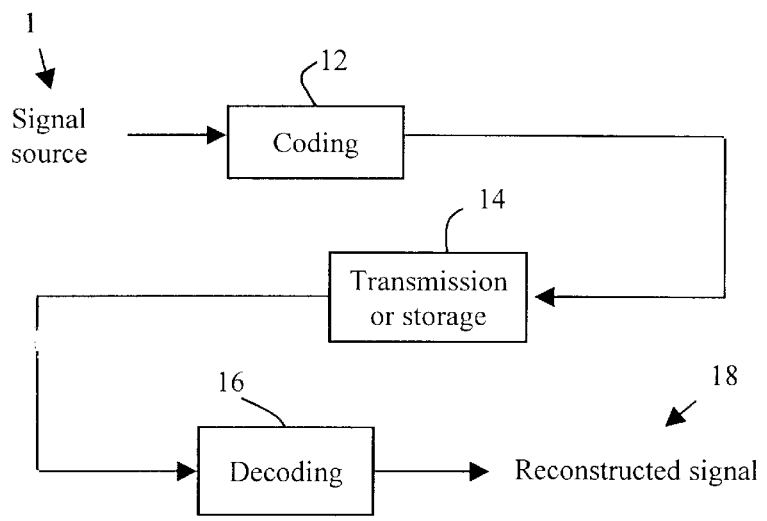
FIG. 1 illustrates schematically the context of the coding and decoding methods and devices of the invention.

As shown in FIG. 1, a digital signal source 1 is considered, producing either an image signal or a video signal, or a sound signal, or a data signal.

The signal issuing from this digital signal source (block 12 in FIG. 1) is to be coded, with a view to transmitting or storing this signal in compressed form (reference 14 in FIG. 1).

In order to reconstitute the original signal (reconstructed signal 18 in FIG. 1), it is necessary to decode (block 16) the coded signal transmitted or stored, the decoding operation necessarily being the transformation which is the reverse of the coding operation so that the signal is correctly reconstructed.

Figure 2:
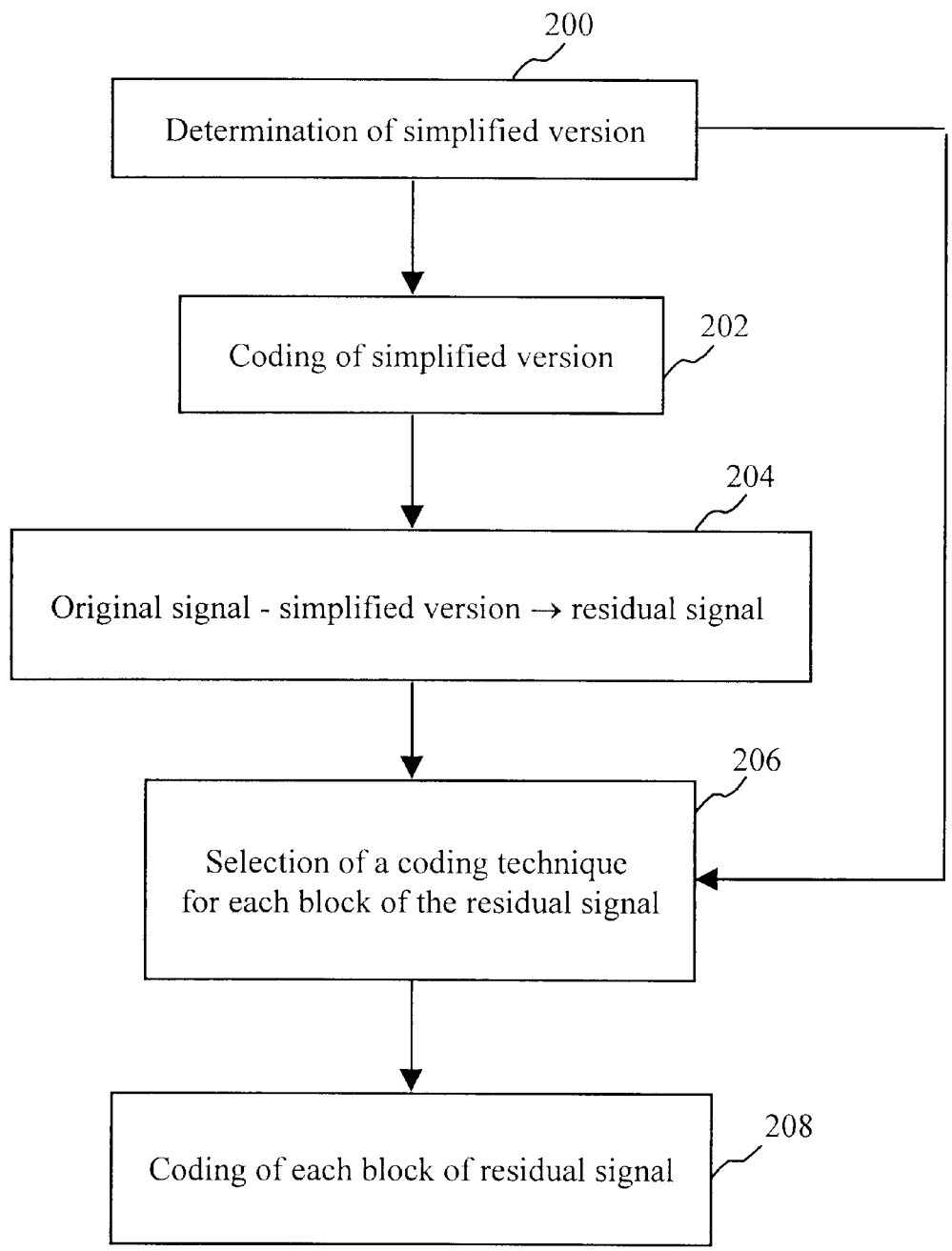
FIG. 2 is a flow diagram illustrating successive steps of the coding method of the invention, in a particular embodiment.

FIG. 2 presents the succession of steps performed in the context of the coding method of the invention, in a particular embodiment.

A digital signal is considered, containing a certain quantity of information. A first step 200 of the method consists of determining a simplified version of the digital signal, that is to say a signal issuing from the original digital signal but containing less information than it.

By way of non-limitative example, when the digital signal is an image signal, the simplified image can be of two types: either it has the same spatial resolution as the original image, or it has a lower spatial resolution.

Simplified images can be obtained with the same spatial resolution as the original image, for example by applying to the latter an opening-closing morphological operator, followed by a morphological reconstruction. This type of processing eliminates the objects which are smaller than a certain size and restores the contours of the objects which have not been completely eliminated.

It is possible to obtain simplified images with a spatial resolution lower than that of the original image, for example by applying to the latter a decomposition into sub-bands by wavelet transformation, and keeping, as a simplified image, a sub-band obtained by low-pass filtering during the decomposition.

The following step 202 of the method consists of coding the simplified version previously obtained. For this purpose, use is made of a predetermined single technique of coding without losses, for example, for image signals, a coding by discrete cosine transformation without losses, or a conventional technique of segmentation card coding without losses.

During a following step 204, a residual signal is determined, defined as the difference between the original digital signal and the simplified version. For this purpose, if the signals under consideration are images, in a particular embodiment where the simplified image is obtained from the original image by applying an opening-closing morphological operator, followed by a morphological reconstruction, the simplified version is subtracted from the original signal, point by point. If, as a variant, the simplified image is obtained from the original image by applying wavelet transformation and storing the low sub-band, the subtraction step 204 consists of omitting considering this low sub-band in order to obtain the residual image.

The purpose of the following step 206 is to select, for each block of the residual signal, a coding technique amongst a predetermined number M of coding techniques Ci, where i is an integer between 1 and M. For this the simplified version is used.

For example, where the digital signal is an image signal, and if certain coding techniques are particularly efficacious for coding textured regions, and other coding techniques are particularly efficacious for coding contours, the simplified image is used for distinguishing the regions containing contours from the regions containing textures. This distinction can be obtained by any method known to persons skilled in the art: it is known, for example, that calculating the spatial gradient gives information on the location of the image contours.

Knowing in this way the most appropriate coding technique for coding each block of the simplified version, at step 208, this coding technique is applied to the corresponding block, that is to say, for an image signal, to the block with the same spatial coordinates, in the residual signal.

Figure 3:
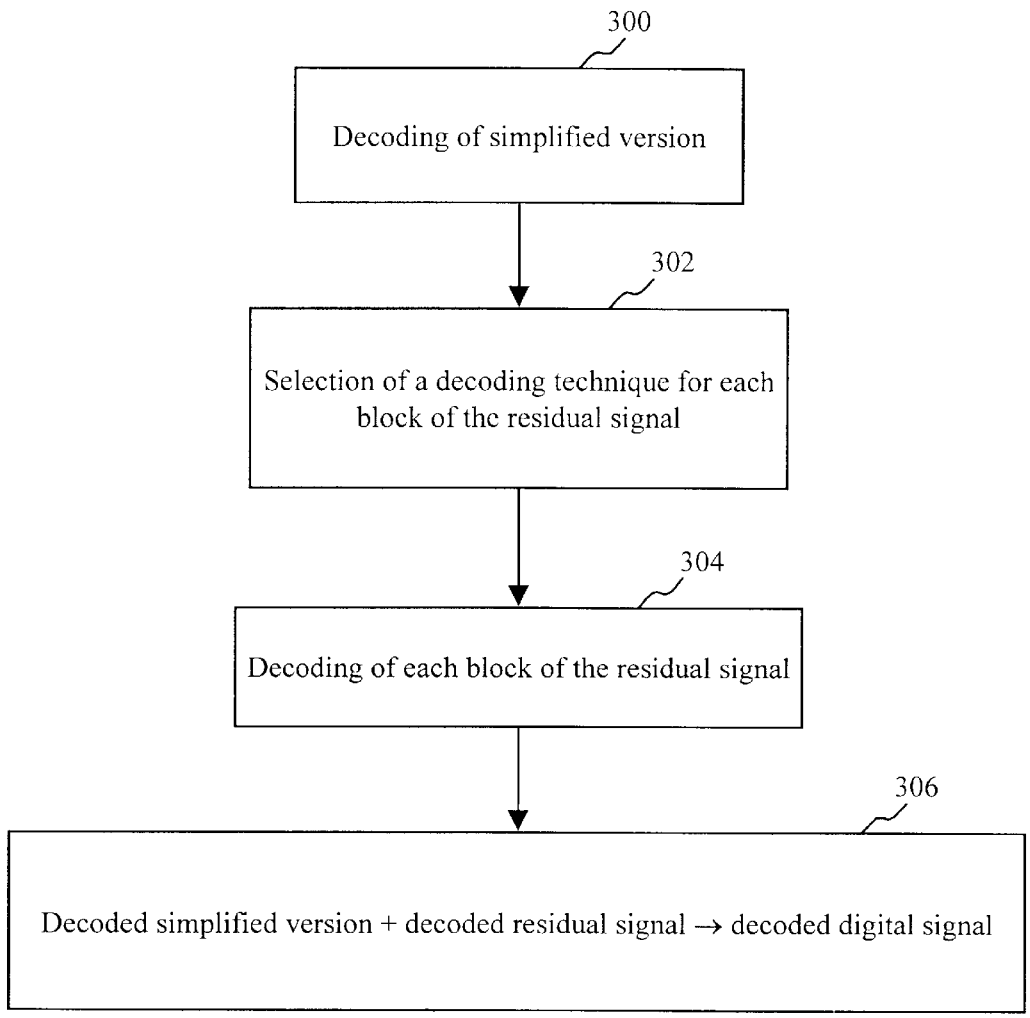
FIG. 3 is a flow diagram illustrating successive steps of the decoding method of the invention, in a particular embodiment.

The flow diagram of FIG. 3 illustrates a decoding method adapted to decode signals coded in accordance with the coding method which has just been described.

At step 300, the first step is to decode the coded simplified version of the signal, by means of the decoding technique which is the reverse of the predetermined single coding technique which was used.

Next, in accordance with the invention, it is the simplified image which is used for selecting, at step 302, amongst the M decoding techniques Di corresponding respectively to the M coding techniques Ci, the decoding technique associated with the coding technique which was actually used for coding each block of the residual signal.

For example, where the digital signal is an image signal, the presence of contours and the presence of textures are sought in the decoded simplified image, and then there is selected, for the blocks of the residual image corresponding spatially to the blocks of the simplified image containing contours, the decoding technique associated with the coding technique which was particularly efficacious for coding contours, and there is selected, for the blocks of the residual image corresponding spatially to the blocks of the simplified image containing textures, the decoding technique associated with the coding technique which was particularly efficacious for coding textures.

At step 304, each block of the residual signal is decoded by means of the decoding technique selected at the previous step.

Finally, at step 306, the decoded simplified image and the decoded residual image are added, in order to obtain the original, decoded, image There is described below, by means of FIG. 4, a first variant embodiment of the coding method of the invention. This variant belongs to the field of digital image coding.

The digital image under consideration is divided into frequency sub-bands, and each sub-band is coded independently of the others. Each sub-band is divided into blocks. It is assumed that each block can be coded, as required, by means of two coding techniques: a technique C1 of setting the coefficients to zero and a technique C2 of vector quantisation. The low sub-band obtained by wavelet transformation is considered to be the simplified image.

Figure 4:
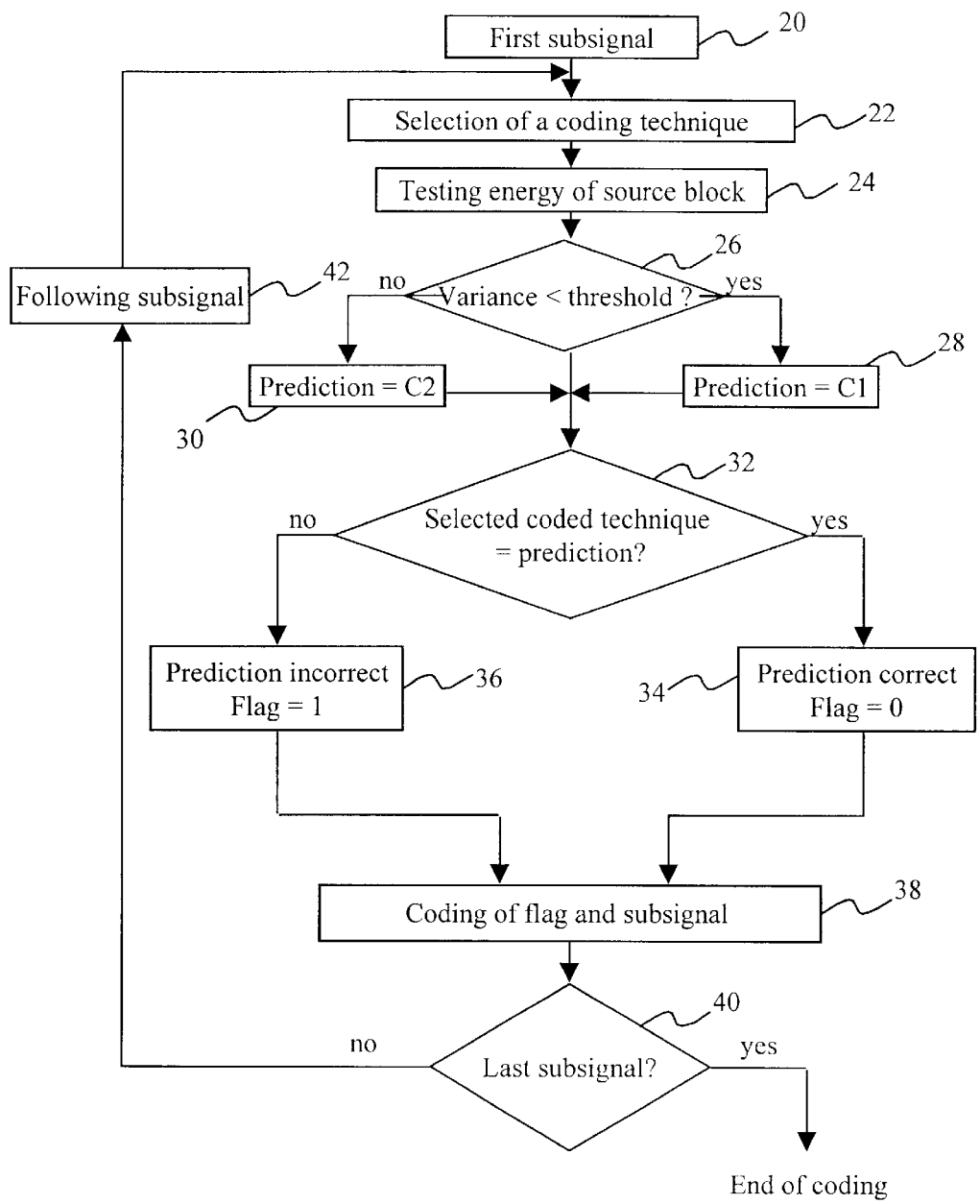
FIG. 4 is a flow diagram illustrating successive steps of the coding method of the invention, in a first variant embodiment.

At step 20 illustrated by FIG. 4, a first residual subsignal is considered. It is a block of one of the detail sub-bands, obtained by wavelet transformation of the original digital image.

At step 22, for this subsignal, the most appropriate coding technique is selected amongst the two techniques C1 and C2.

For this purpose, for example, a criterion of optimisation of the ratio of transmission rate to distortion is applied. It is possible to proceed as follows. The subsignal under consideration is coded by means of the two coding techniques C1 and C2, so as to obtain two coded subsignals. Then the coded subsignals are compared in order to select the most appropriate coding technique. To make this comparison, there are calculated, for example, on the one hand the two transmission rates necessary for transmitting respectively the two coded subsignals and on the other hand the coding errors or distortion, caused by each coding technique. These coding errors measure respectively the root mean square error caused in the reconstructed image by the coding of the subsignal under consideration, according to each of the coding techniques. A comparison is then made, by way of non-limitative example, between the weighted sums $R+\lambda.D$, R designating the transmission rate, D designating the distortion and $\lambda$ being an adjustment coefficient, which were obtained for each of the coded subsignals.

The coding technique for which the value of this weighted sum is the lowest is then selected, for the subsignal under consideration.

At step 24, the simplified image is used for predicting the decision to be made on the technique of coding the signal currently being coded. For this purpose, in the variant described here, the variance of the subsignal of the simplified image corresponding to the residual signal currently being coded is calculated. If the value of the variance is below a predetermined threshold (step 26), the prediction is the coding technique C1 of setting the coefficients to zero (step 28). Otherwise (step 30), the prediction is the coding technique C2 of vector quantisation (step 30).

At step 32, the validity of the prediction made is evaluated by comparing the predicted coding technique and the coding technique selected using the criterion of optimisation of the ratio of transmission rate to distortion.

If the predicted and selected techniques are the same, the value "0" is allocated arbitrarily to a flag, indicating that the prediction is correct (step 34). Otherwise (step 36) the value "1" is allocated to the flag, indicating that the prediction is false. The choice of these values can of course be reversed.

At step 38, the residual subsignal is coded by means of the coding technique selected at step 22, and the flag is coded, for which one bit suffices.

Steps 40 and 42 illustrate the fact that the same procedure is followed with all the other subsignals.

Thus, instead of transmitting the coding technique actually used to the decoder, information on the validity of the prediction of this coding technique is transmitted to it. In this way the quantity of information necessary for transmission is reduced.

Figure 6:
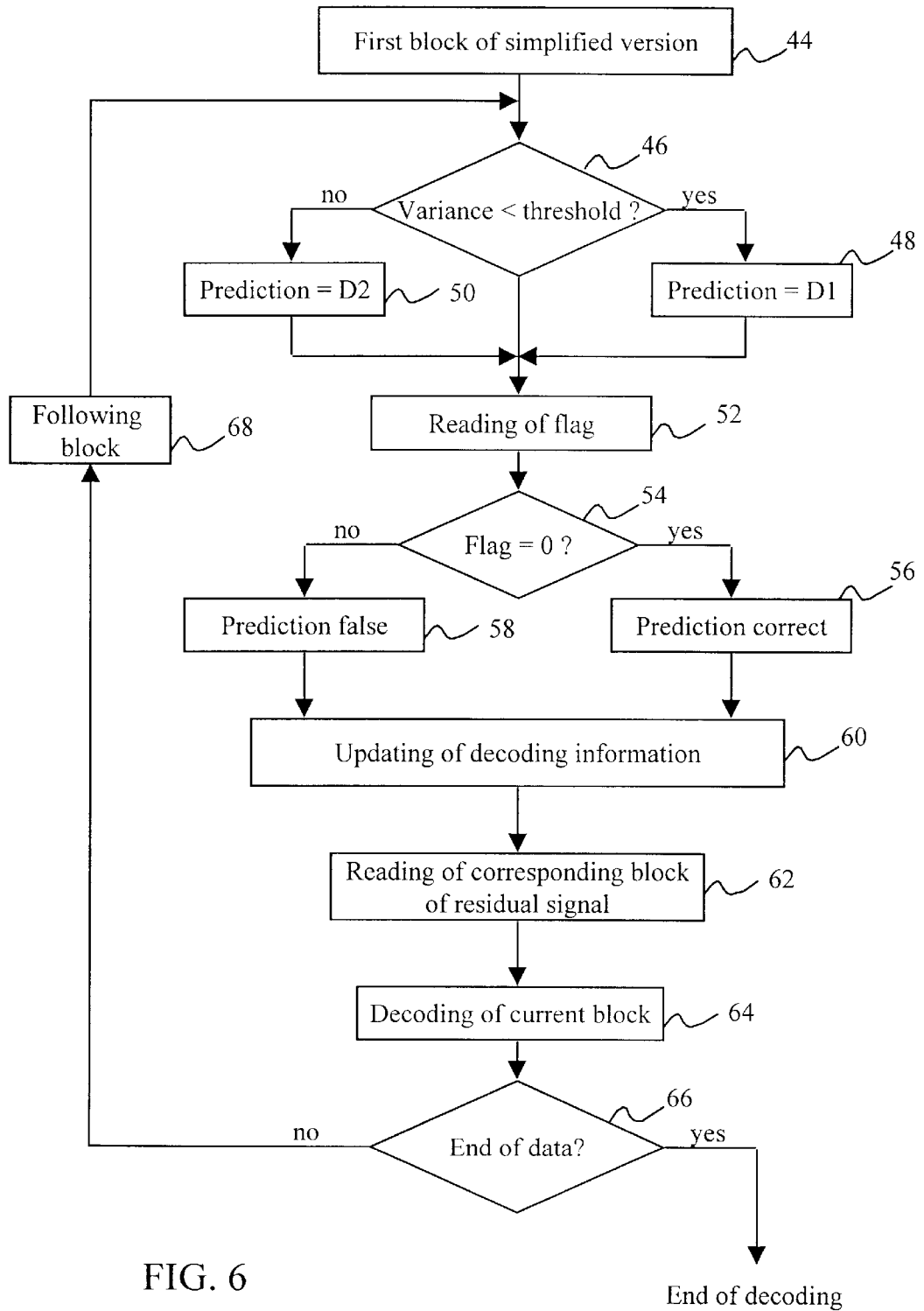
FIG. 6 is a flow diagram illustrating successive steps of the decoding method of the invention, in the first variant embodiment.

FIG. 6 illustrates the succession of steps performed in the context of the same variant embodiment, during decoding.

At step 44, the first block of the simplified image is considered.

At step 46, it is tested whether the value of the variance of the block under consideration is below a predetermined threshold. If such is the case (step 48), the result of the prediction of the decoding technique to be used for this block is technique D1, associated with coding technique C1 (setting to zero). Otherwise (step 50), the result of the prediction is decoding technique D2, associated with coding technique C2 (vector quantisation).

Next, at step 52, the flag which was transmitted with the coded signal is read.

The value of this flag is tested at step 54. If its value is "0", this means that the prediction is correct (step 56), and if its value is "1", this means that the prediction is false (step 58).

At step 60, the decoding information is updated accordingly.

At step 62, the block of the residual image which corresponds spatially to the relevant block of the simplified image is read.

At step 64, this block of the residual image is decoded, by means of the decoding technique corresponding to the prediction if the prediction is correct, and by means of the other technique if the prediction is false.

Step 66 and 68 illustrate the fact that same procedure is followed with all the other blocks of the signal.

Figure 5:
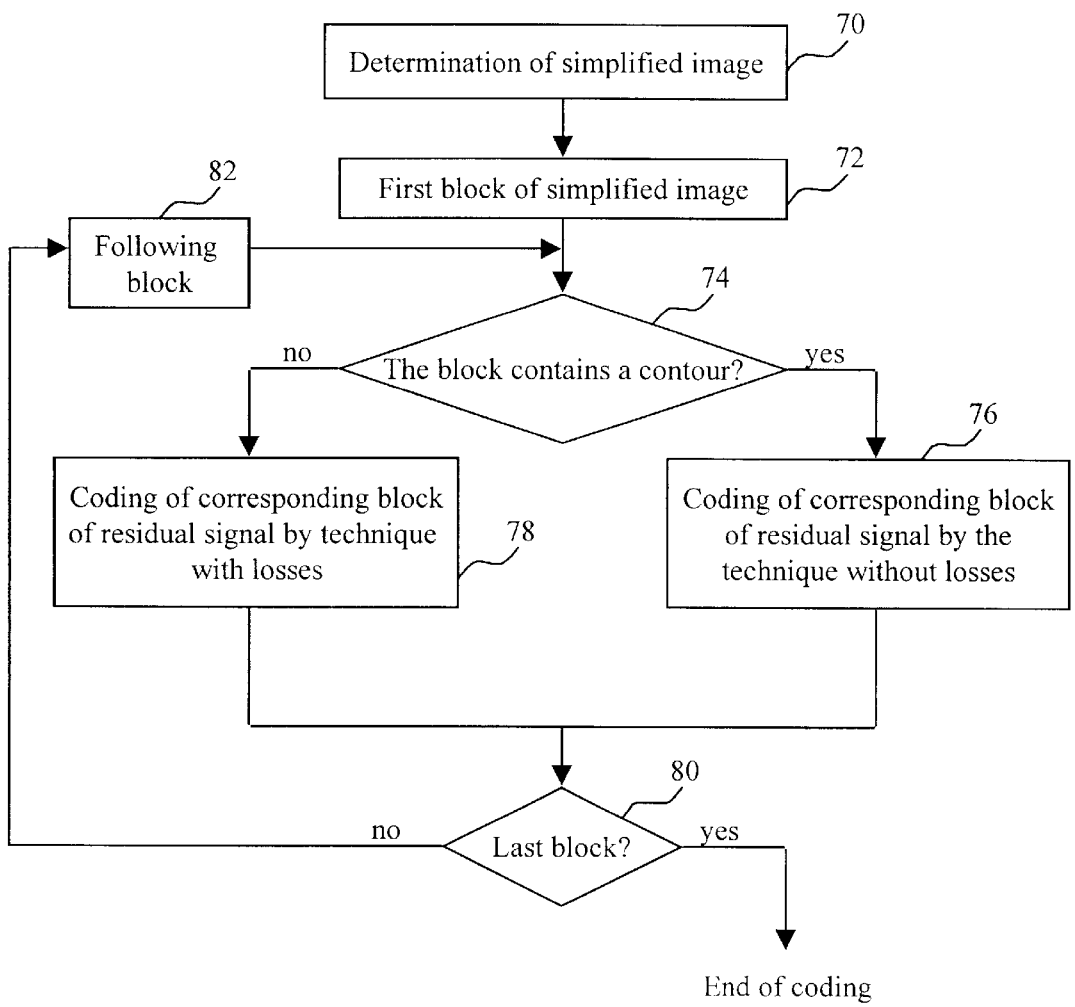
FIG. 5 is a flow diagram illustrating successive steps of the coding method of the invention, in a second variant embodiment.

FIG. 5 illustrates a second variant embodiment of the coding method of the invention, also in the case where the signals considered are image signals.

It is assumed here that there is a choice between two coding techniques, one with losses of information and one without losses of information.

The simplified image has here the same spatial resolution as the original image. The simplified image is determined at step 70, by means of an opening-closing morphological operator followed by a morphological reconstruction.

At step 72, the first block of the simplified image is considered.

The simplified image is used for determining whether a contour passes through the block being coded.

At step 74, the presence of a contour is thus sought in the block of the simplified image under consideration. As indicated above, this seeking can be carried out by any method known to persons skilled in the art, such as calculation of the spatial gradient.

The contour regions being particularly important, if the result of step 74 is that the block under consideration contains a contour, at step 76 it is chosen to code the corresponding block of the residual image by means of the technique of coding without losses. Otherwise the technique of coding with losses is chosen (step 78).

Steps 80 and 82 illustrate the fact that the same procedure is followed with all the other blocks.

Figure 7:
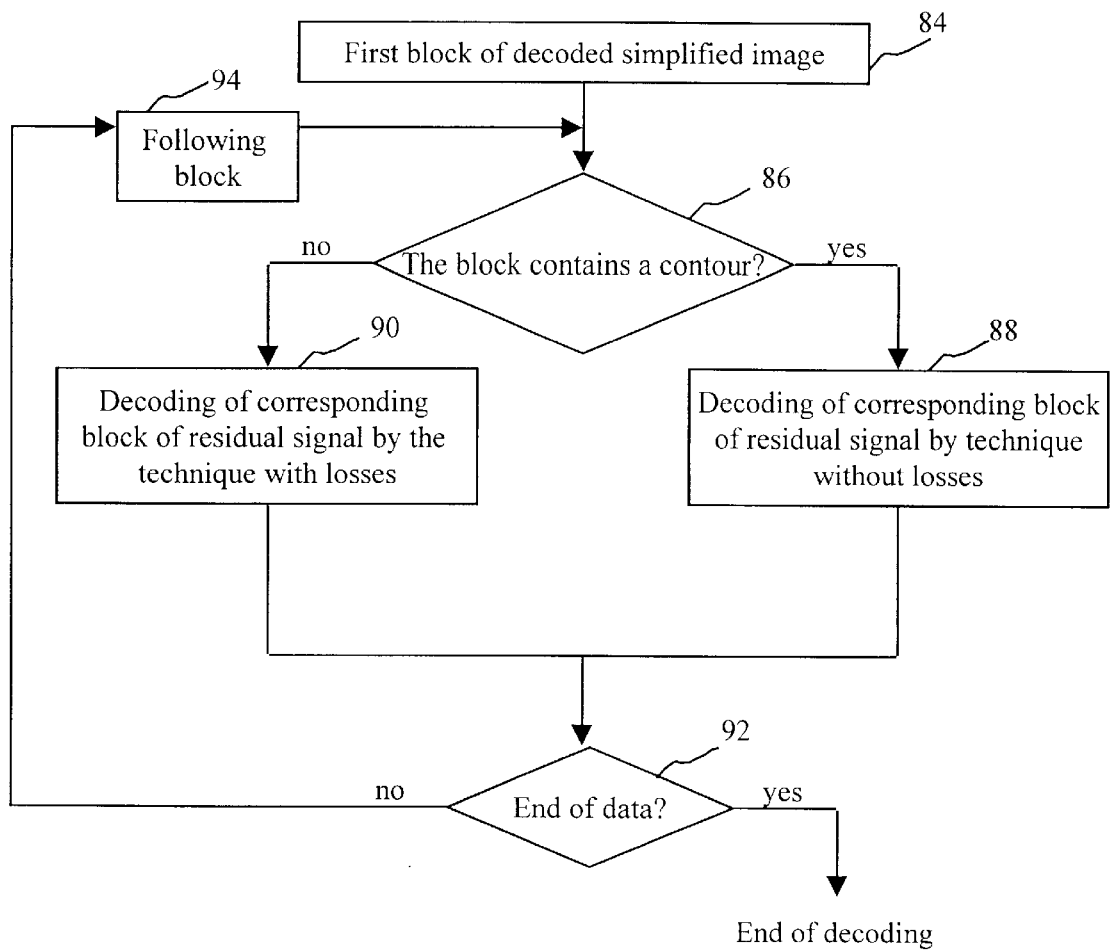
FIG. 7 is a flow diagram illustrating successive steps of the decoding method of the invention, in the second variant embodiment.

FIG. 7 illustrates the succession of steps performed in the context of this second variant embodiment, during decoding.

At step 84, the first block of the simplified image is considered, previously decoded by means of the decoding technique which is the reverse of the predetermined single coding technique used for coding the simplified image.

As at step 74 of the coding method (FIG. 5), the presence of contours is sought, at step 86, in the block of the simplified image under consideration.

If the block of the simplified image under consideration contains at least one contour (step 88), the corresponding block of the residual image is decoded by means of the technique of decoding without losses. Otherwise (step 90), the corresponding block of the residual image is decoded by means of the technique of decoding with losses.

Steps 92 and 94 illustrate the fact that the same procedure is followed with all the other blocks.

Figure 8:
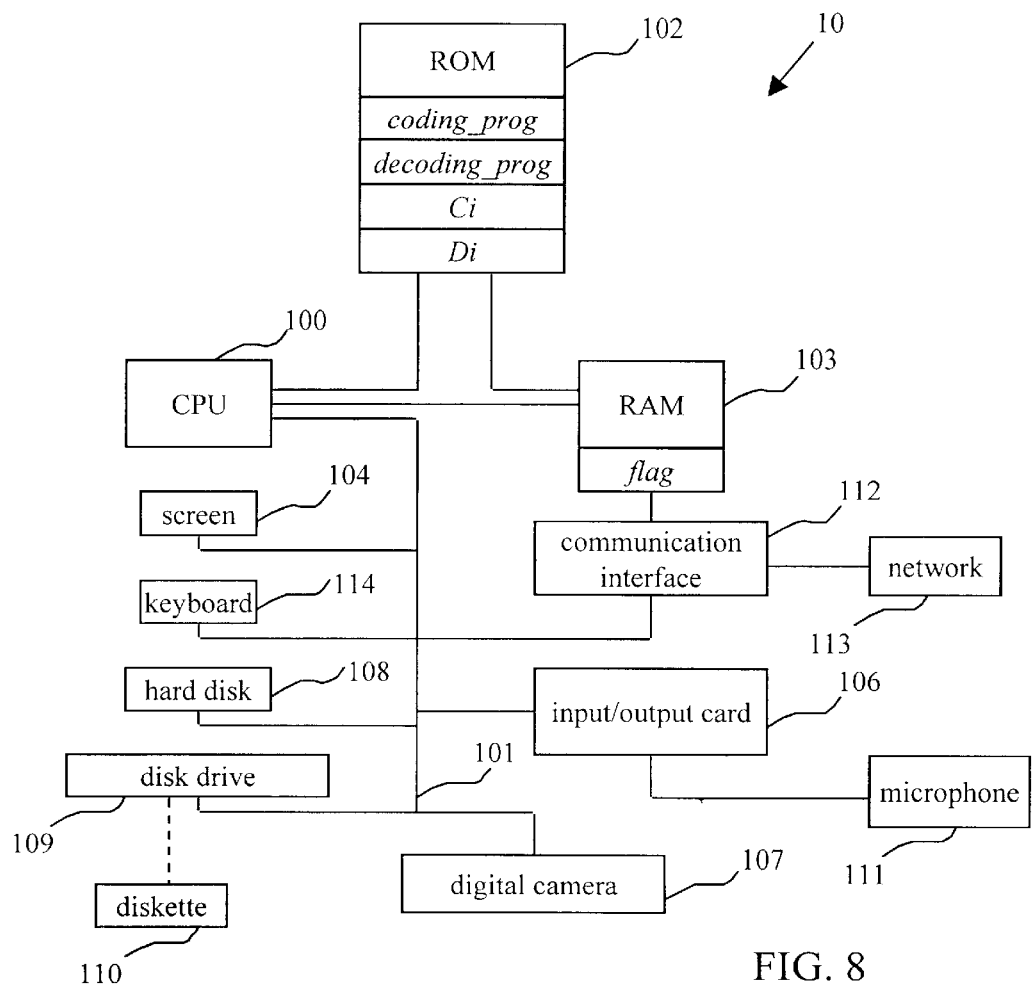
FIG. 8 depicts schematically a particular embodiment of a system able to contain all or part of a coding device according to the invention or all or part of a decoding device according to the invention.

The system 10 depicted schematically in FIG. 8, as described below, may contain all the coding device of the present invention or only part thereof, and/or all the decoding device of the present invention or only part thereof.

This system 10 can for example be a microcomputer, connected to different peripherals such as a digital camera 107, or a scanner, or any means of capturing and storing images. The camera 107 is for example connected to a graphics card and supplies data to be compressed and therefore to be coded.

The system 10 has a communication interface 112 connected to a network 113, which is able both to transmit to the system 10 data to be compressed coming from the outside and to transmit compressed data coming from the system 10 to other points of this network 113.

The system 10 also has a storage means 108, such as a hard disk for example. The system 10 thus includes a disk drive 109, which is designed to receive diskettes 110. As a variant, the disk drive 109 and diskettes 110 can be replaced respectively by a reader for fixed-memory compact discs (CD-ROMs) and fixed-memory compact discs, or a memory card reader and memory cards, or by a digital video disc player. The diskettes, fixed memory compact discs, memory cards or digital video discs 110 and the hard disk 108 can contain data coded in accordance with the coding method described above, and can also contain programs for executing the successive steps of the coding method and/or of the decoding method described above.

According to a first variant, the programs enabling the system 10 to implement the coding method and the decoding method of the invention can be stored in a read only memory 102.

According to a second variant, the aforementioned programs can be received coming from the network 113 by means of the communication interface 112.

Where the data to be compressed consist of audio signals, the system 10 is connected to an external microphone 111, by means of an input/output card 106.

The system 10 optionally also has a screen 104 and/or a keyboard 114. The screen 104 can display the data to be compressed and/or serve as an interface with a user of the system 10. This user can for example be given the possibility of choosing between several coding techniques, entering this choice by means of the keyboard.

A central processing unit 100 included in the system 10 and connected, for example by means of a communication bus 101, to the elements 102 to 104, 106 to 109, 112 and 114 described above, executes the instructions stored in the read only memory 102 or in the other storage elements and relating to the steps of the coding method and/or decoding method described above.

Thus the central processing unit 100 is adapted to implement the flow diagrams described in FIGS. 2 to 7.

The central processing unit 100, the read only memory 102 and the random access memory 103 can cooperate in order to form:
  simplification means, for determining a simplified version of the digital signal, containing only part of the information contained in the digital signal;
  first coding means, for coding the simplified version by means of a predetermined single coding technique;
  subtraction means, for subtracting the simplified version from the digital signal, so as to obtain a residual signal;
  coding selection means for selecting, on the basis of each block of the simplified version, for each corresponding block of the residual signal, a coding technique amongst a predetermined number M of coding techniques Ci, where i is an integer between 1 and M, these coding selection means having prediction means for predicting, on the basis of the simplified version, for each block of the digital signal, the most appropriate coding technique amongst the M coding techniques Ci; and
  second coding means, for coding each block of the residual signal by means of the coding technique selected by the coding selection means.

Thus, the system 10 can comprise a digital signal coding device having means adapted to implement a coding method as described above.

In addition, the central processing unit 100, the read only memory 102 and the random access memory 103 can cooperate in order to form:
  first decoding means, for decoding the simplified version by means of the decoding technique associated with the aforementioned single coding technique;
  decoding selection means, for selecting, on the basis of each block of the decoded simplified version, for each corresponding block of the residual signal, a decoding technique taken from amongst a predetermined number M of decoding techniques Di respectively associated with the coding techniques Ci, these decoding selection means having prediction means for predicting, from each block of the decoded simplified version, for the corresponding block of the residual signal, the most appropriate decoding technique associated with one of the M coding techniques Ci;
  second decoding means, for decoding each block of the residual signal by means of the decoding technique selected for this block by the decoding selection means; and
  adding means, for adding the decoded simplified version to the decoded residual signal, so as to reconstitute the original digital signal.

Thus, the system 10 can comprise a digital signal decoding device having means adapted to implement a decoding method as described above.

According to a first variant embodiment, when the system 10 is powered up, the coding and/or decoding programs and techniques stored in one of the non-volatile memories, for example the read only memory 102, are transferred into a random access memory 103 of the system 10, which then contains the executable code and the variables necessary to the implementation of the coding and/or decoding method of the invention.

According to a second variant embodiment, the different coding and/or decoding techniques liable to used can be stored in storage elements different from those which store the executable code. In fact the invention can be improved by introducing, into the system 10, additional coding and decoding techniques, either by means of the network 113, via the communication interface 112, or by means of a diskette or similar data medium 110.

The communication bus 101 allows communication between the different entities included in the system 10, or connected thereto, such as the digital camera 107. However, the representation of the bus 101 proposed in FIG. 8 is in no way limitative. In particular, the central processing unit 100 is able to communicate instructions to any entity included in the system 10, either directly, or by means of another entity of the system 10.

What is claimed is:

1. Method of coding a digital signal, wherein:
  (a) a signal simplification step is performed, during which a simplified version of the digital signal is determined, containing only part of the information contained in the digital signal;
  (b) a step of coding the simplified signal is performed, during which the simplified version is coded by means of a predetermined single coding technique;
  (c) a subtraction step is performed, during which the simplified version is subtracted from the digital signal, so as to obtain a residual signal;
  (d) a coding selection step is performed, during which, on the basis of each block of the simplified version, one coding technique, amongst a predetermined number M of coding techniques Ci, where i is an integer between 1 and M, is selected for each corresponding block of the residual signal; and (e) a residual signal coding step is performed, during which each block of the residual signal is coded by means of the previously selected coding technique.

2. Coding method according to claim 1, wherein the simplified signal coding step (b) is performed indifferently at the end of the step of (a) signal simplification, (c) subtraction, (d) coding selection, or (e) residual signal coding of the residual signal.

3. Coding method according to claim 1 or 2, in which the digital signal is an image signal, and said simplified version has the same spatial resolution as said digital signal.

4. Coding method according to claim 3, wherein, in order to determine the simplified version, an opening-closing operator, and then a morphological reconstruction, are applied successively to the digital signal.

5. Coding method according to claim 1 or 2, wherein the digital signal is an image signal, and the simplified version has a spatial resolution less than the spatial resolution of the digital signal.

6. Coding method according to claim 5, wherein, in order to determine the simplified version, a wavelet decomposition is applied to the digital signal and a sub-band obtained by low-pass filtering during the decomposition is adopted as the simplified version.

7. Coding method according to claim 1 or 2, wherein, in the coding selection step (d), a prediction step is performed, during which, on the basis of the simplified version, there is predicted for each block of the digital signal, the most appropriate coding technique amongst the M coding techniques Ci, and said method also includes steps in which:

(f) an optimised optimized coding selection step is performed, during which, using a predetermined optimization criterion, the most appropriate coding technique amongst the M coding techniques Ci is selected for each block of the residual signal, and this block is coded by means of the coding technique selected;

(g) a comparison step is performed, during which, for each block of the digital signal, the coding technique predicted in the coding selection step (d) and the coding technique selected in the optimized coding selection step (f) are compared; and (h) a storage step is performed, during which, if the predicted and selected coding technique are identical, there is stored, with a view to decoding, a flag according to which the prediction made in the coding selection step (d) is correct, and otherwise a flag is stored according to which this prediction is false.

8. Coding method according to claim 7, wherein, in the optimized coding selection step (f), a method of optimizing the ratio of transmission rate to distortion is used.

9. Coding method according to claim 1 or 2, in wherein the digital signal is an image signal and in M coding techniques Ci comprise a technique of coding with losses of information and a technique of coding without losses of information, and wherein, in the coding selection step (d), the presence of contours is sought in each block of the simplified version, and then:

(d1) a coding step without losses is performed, during which, if the block under consideration contains at least one contour, the corresponding block of the residual signal is coded by means of the technique of coding without losses of information; or (d2) a step of coding with losses is performed, during which, if the block under consideration contains no contour, the corresponding block of the residual signal is coded by means of the technique of coding with losses of information.

10. Method of decoding a coded digital signal, the coded signal coming from an original digital signal decomposed into a simplified version and a residual signal, obtained by subtracting the simplified version from the original digital signal, the simplified version being coded by means of a predetermined single coding technique, and the residual signal being coded by means of a coding technique selected from amongst a predetermined number M of coding techniques Ci, where i is an integer between 1 and M, wherein:

a simplified signal decoding step is performed, during which the simplified version is decoded by means of the decoding technique associated with the predetermined single coding technique; and a decoding selection step is performed, during which, on the basis of each block of the decoded simplified version, there is selected, for each corresponding block of the residual signal, a decoding technique taken from amongst a predetermined number M of decoding techniques Di respectively associated with the M coding techniques Ci;

a residual signal decoding step is performed, during which each block of the residual signal is decoded by means of the decoding technique which was selected for this block; and an addition step is performed, during which the decoded simplified version is added to the decoded residual signal, so as to reconstitute the original digital signal.

11. Decoding method according to claim 10, wherein the digital signal is an image signal, and the simplified version has the same spatial resolution as the digital signal.

12. Decoding method according to claim 10, wherein the digital signal is an image signal, and the simplified version has a spatial resolution less than the spatial resolution of the digital signal.

13. Decoding method according to any one of claims 10 to 12, in which, during said decoding selection step, a prediction step is performed, during which, on the basis of each block of the decoded simplified version, there is predicted, for the corresponding block of the residual signal, the most appropriate decoding technique associated with one of said M coding techniques Ci;

a reading step is performed, during which a flag associated with the block of the simplified version under consideration is read, relating to the validity of said prediction of the coding technique for the corresponding block of the digital signal;

a residual signal decoding step is performed, during which, if and only if, according to the flag, the prediction is correct, the corresponding block of the residual signal is decoded by means of the predicted decoding technique.

14. Decoding method according to any one of claims 10 to 12, in which the digital signal is an image signal and the M coding techniques Ci comprise a technique of coding with losses of information and a technique of coding without losses of information, characterised in that, during said decoding selection step, the presence of contours is sought in each block of the decoded simplified version, and then a decoding step without losses is performed, during which, if the block under consideration contains at least one contour, the corresponding block of the residual signal is decoded by means of the technique of decoding without losses of information associated with the technique of coding without losses of information; or a decoding step with losses is performed, during which, if the block under consideration contains no contour, the corresponding block of the residual signal is decoded by means of the technique of decoding with losses of information associated with the technique of coding with losses of information.

15. Device for coding a digital signal, comprising:

simplification means, for determining a simplified version of the digital signal, containing only some of the information contained in the digital signal;

first coding means, for coding the simplified version by means of a predetermined single coding technique;

subtraction means, for subtracting the simplified version from the digital signal, so as to obtain a residual signal;

coding selection means, for selecting, on the basis of each block of the simplified version, for each corresponding block of the residual signal, a coding technique amongst a predetermined number M of coding techniques $C_i$, where i is an integer between 1 and M; and second coding means, for coding each block of the residual signal i by means of the coding technique selected by the selection means.

16. Coding device according to claim 15, wherein said coding selection means includes prediction means for predicting, on the basis of the simplified version, for each block of the digital signal, the most appropriate coding technique amongst the M coding techniques $C_i$.

17. Device for decoding a coded digital signal, the coded signal coming from an original digital signal decomposed into a simplified version and a residual signal, obtained by subtracting the simplified version from the original digital signal, the simplified version being coded by means of a predetermined single coding technique, and the residual signal being coded by means of a coding technique selected from amongst a predetermined number M of coding i techniques $C_i$, where i is an integer between 1 and M, comprising:

first decoding means, for decoding the simplified version by means of the decoding technique associated with the predetermined single coding technique;

decoding selection means, for selecting, on the basis of each block of the decoded simplified version, for each corresponding block of the residual signal, a decoding technique taken from amongst a predetermined number M of decoding techniques $D_i$ respectively associated with the coding techniques $C_i$;

second decoding means, for decoding each block of the residual signal by means of the decoding technique selected for this block by the selection means; and adding means, for adding the decoded simplified version to the decoded residual signal, so as to reconstitute the original digital signal.

18. Decoding device according to claim 17, wherein said decoding selection means includes prediction means for predicting, on the basis of each block of the decoded simplified version, for the corresponding block of the residual signal, the most appropriate decoding technique associated with one of the M coding techniques $C_i$.

19. Digital signal processing apparatus, comprising means adapted to implement a coding method according to claim 1 or 2.

20. Digital signal processing apparatus, comprising means adapted to implement a decoding method according to any one of claims 10 to 12.

21. Digital signal processing apparatus, comprising a coding device according to claim 15 or 16.

22. Digital signal processing apparatus, comprising a decoding device according to claim 17 or 18.

23. Method of coding a digital signal, comprising the steps of:

generating a simplified signal and a residual signal from the digital signal;

determining a coding technique for the residual signal among a set of coding techniques on the basis of a feature of the simplified signal; and coding the residual signal with said determined coding technique and the simplified signal with a predetermined coding technique.

24. Method of coding a digital signal according to claim 23, said method further comprising the step of:

dividing the simplified signal and the residual signal into a plurality of blocks respectively.

25. Method of coding a digital signal according to claim 24, wherein the determining step includes determining coding techniques on the basis of each block of the simplified signal for each corresponding block of the residual signal.

26. Method of coding a digital signal according to claim 23, wherein the simplified signal is generated by a wavelet transformation of the digital signal.

27. Method of decoding a signal coded by means of a coding method according to any one of claims 23 to 26, further comprising the steps of:

decoding the coded simplified signal;

determining a decoding technique for the coded residual signal among a set of decoding techniques on the basis of a feature of the decoded simplified signal; and decoding the coded residual signal with the determined decoding technique.

28. Method of decoding a digital signal according to claim 27, wherein said determining step includes determining decoding techniques on the basis of each block of the decoded simplified signal for each corresponding block of the coded residual signal.

29. Device for coding a digital signal, adapted to implement a coding method according to any one of claims 23 to 26.

30. Device for decoding a digital signal, adapted to implement a decoding method according to claim 27.

31. Digital signal processing apparatus, adapted to implement a coding method according to any one of claims 23 to 26.

32. Digital signal processing apparatus, adapted to implement a decoding method according to claim 27.

* * * * *

UNITED STATES PATENT AND TRADEMARK OFFICE
CERTIFICATE OF CORRECTION

PATENT NO. : 6,631,213 B1
DATED : October 7, 2003
INVENTOR(S) : Isabelle Amonou et al.

It is certified that error appears in the above-identified patent and that said Letters Patent is hereby corrected as shown below:

Column 8,
Line 12, "art: it" should read -- art. It --.

Column 10,
Line 10, "Step 66" should read -- Steps 66 --.

Column 13,
Line 33, "optimised" should be deleted;
Line 45, "technique" should read -- techniques --; and
Line 53, "in" should be deleted.

Column 14,
Line 48, "signal;" should read -- signal; and --.

Column 15,
Line 36, "i" should be deleted.

Signed and Sealed this

Twentieth Day of September, 2005

JON W. DUDAS
*Director of the United States Patent and Trademark Office*